Feb. 5, 1952 W. J. HUGHES 2,584,455
PNEUMATIC TELEMETERING TRANSMITTER
Filed Aug. 5, 1947

INVENTOR.
Walter J. Hughes,
BY

Patented Feb. 5, 1952

2,584,455

UNITED STATES PATENT OFFICE 2,584,455

PNEUMATIC TELEMETERING TRANSMITTER

Walter J. Hughes, Chicago, Ill., assignor to Infilco Incorporated, Chicago, Ill., a corporation of Delaware Application August 5, 1947, Serial No. 766,323

5 Claims. (Cl. 137—153)

This invention relates to pneumatic telemetering systems and more particularly to a simplified and improved apparatus for measuring a variable resultant force attendant upon a variable condition and transmitting a controlled pneumatic pressure to a remote point where it may be utilied as a measure or control.

It is an object of this invention to provide an improved pneumatic telemetering transmitter of increased accuracy and sensitivity. The apparatus of the present invention acts substantially simultaneously in response to increase or decrease in the resultant force to be measured and is of simple and rugged construction, avoiding the use of packing glands or other power consuming devices and is operable on a minimum amount of air supply. In addition it has the feature that the air supply is automatically stopped when the force to be measured is zero.

A still further object of this invention is to provide an improved telemetric converter by means of which a range in forces of varying values is converted into a controlled pressure within a preselected range which bears a linear relationship to the forces, and whereby the use of air pressure for the telemetering medium is nullified when the force to be measured is nil.

It is another object of the present invention to provide an apparatus that is independent of moderate variations in the air supply pressure so that the delicate regulation of air supply pressure is avoided, and also one which operates on a moderate quantity of air and a relatively low pressure range whereby the cost of compression is reduced.

A still further object of the present invention is to provide an improved pneumatic telemetering transmitter particularly adapted to measure pneumatically the difference between two forces (or to measure the difference between two pressures by converting each into a force) which is characterized by the use of a small volume of air at a low pressure even though the forces being measured are rather large and in which no air is used when the resultant of the forces is zero.

These and other objects of my invention will be apparent from the description and claims which follow.

The present invention is adapted to measure any quantity in which variation in the quantity to be measured is, or can be, represented by a force. The invention is particularly adapted to measure forces resulting from the application of pressures to a metering area (in the present case a diaphragm) and has special utility in measuring the difference between opposing forces. One particularly important use of my invention is in connection with the measurement and control of flows in a fluid treating system, although it will be obvious to those skilled in the art that my invention is not limited to such an application but can be used to measure any quantity which is, or can be converted to, a force within a predetermined range. In such fluid treating systems, flows must be accurately measured and controlled, and such flows, due to changes inherent in the system, ordinarily tend to vary considerably from time to time. Flows in such systems are customarily measured by the use of a pressure differential creating device, such as a Venturi tube, and my invention is particularly adapted to operate from different pressures created in different points of such a pressure differential creating device. However it will be understood that my invention is not limited to such a flow system, nor to use with opposing forces of differing magnitudes, but that it can be used to measure and control a variable characteristic or quantity even though such quantity is a single force rather than a resultant of opposing forces.

My invention will be more clearly understood by a consideration of the details described in connection with the drawing, in which.

In the present invention the apparatus is provided with four chambers, or sections: a high pressure chamber, a low pressure chamber, an intermediate, or controlled, air pressure chamber, and a biasing chamber. The respective chambers are separated one from another by diaphragms so that the use of stuffing glands and other friction consuming devices is not necessary.

Figure 1:
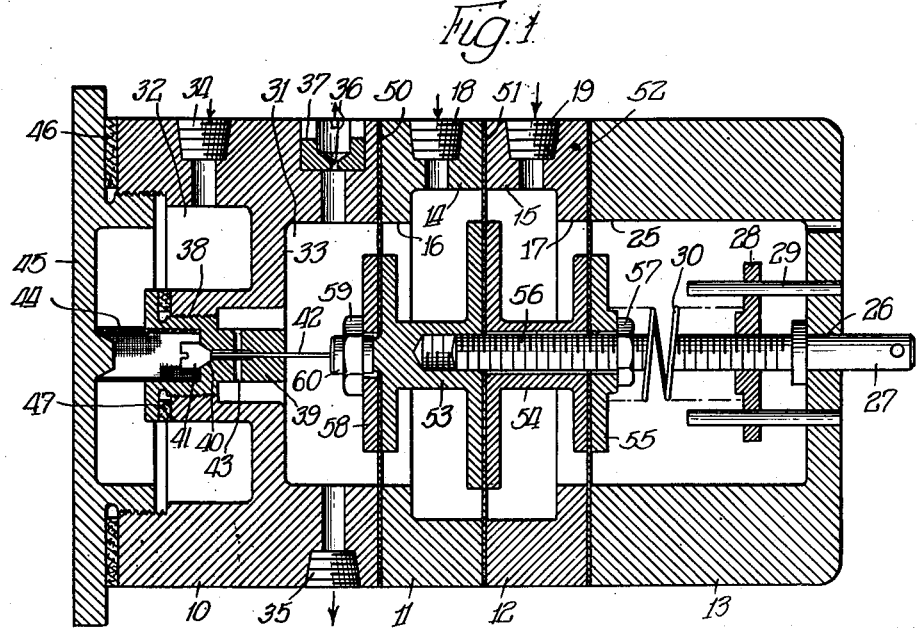
Figure 1 illustrates a cross-sectional view of a simple form of my invention, which is adapted to be placed with its longitudinal axis in a horizontal position.

In the embodiment shown in Figure 1 the four chambers are arranged along a horizontal axis. The body preferably will be composed of four sections which, reading from left to right, from respectively the intermediate or controlled pressure chamber 10, the low pressure chamber 11, the high pressure chamber 12, and the biasing chamber 13. The two intermediate sections which form low and high pressure chambers 11 and 12, are, preferably, identical in size and shape, both being in the form of a hollow member having a greater diameter at their adjoining portions 14 and 15, than at the opposite portions 16 and 17, respectively, as shown. This construction permits use of a diaphragm of larger effective area for separating the low pressure chamber from the high pressure chamber than the effective area of the diaphragms which separate these two chambers from the intermediate pressure chamber and the biasing chamber, respectively. Both sections are drilled and tapped as at 18 and 19, respectively, to receive pressure conduits, not shown. The port 18 in the low pressure chamber 11 may be connected by a suitable conduit to the low pressure point of a pressure differential creating device, such as the throat section of a Venturi tube, not shown. Similarly, the port 19 in the high pressure chamber may be connected by some suitable conduit to a point of high pressure such as the inlet section of a Venturi tube, not shown.

The biasing chamber 13 is concave, as shown, its open face adjacent high pressure chamber 12, being machined, as at 25, to be the same size as the corresponding portion 17 of the high pressure chamber 12. The closed end of the biasing chamber 13 is drilled as at 26 to receive an adjusting screw member 27, which extends into the chamber. The inner end of the member is threaded, as shown, and a spring seat 28 is threaded thereon. The spring seat 28 is held against rotation by suitable stop pins 29. The spring seat 28 holds a compression spring 30, for biasing the diaphragms as hereafter described.

The first section 10 comprises a diaphragm chamber 31 of the same diameter as the restricted portion 16 of the low pressure chamber body 11, and an air inlet valve portion. For ease in protecting and changing the valve I prefer to divide the section 10 into two axially aligned chambers 31 and 32 separated by a wall 33. The second, or inlet, chamber 32 is drilled and tapped, as at 34 to receive a supply conduit for furnishing air under supply pressure. The controlled pressure, or diaphragm, chamber 31 is drilled and tapped, as at 35, to provide a transmission port to receive a conduit for delivering a controlled air pressure to the device to be operated. The controlled pressure chamber is also drilled as at 36 to provide an escape outlet. I have found that when operating at a controlled pressure range of from 0 to 4 pounds per square inch, and a supply pressure of 6 to 10 pounds per square inch, a diameter of 0.002 to 0.005 inch for the escape port is quite practical. It is often more convenient to drill an enlarged port 36 and to provide this port 36 with an outlet insert 37 of the proper size, as shown. The separating plate 33 is drilled and threaded as at 38 to receive a valve seat member 39. The valve seat member 39 is machined as at 40 to form a conical seat having an air tight fit with a valve member 41. A valve member 41 is provided with a valve stem 42 which extends through the valve seat member 39 and into the controlled air pressure chamber 31. Air passing between the valve member 41 and seat 40 enters the intermediate, or controlled, pressure chamber 31 through passageway 43. Preferably the valve 41 and valve seat 40 are protected from dust by a suitable screen guard 44. A removable plate 45 is threaded into the open end of the inlet chamber, preferably being provided with a gasket 46 to form an air tight chamber. Similarly, a gasket 47 may be clamped between the valve seat member 39 and the dividing plate 33 in order to prevent any possible leakage of air from one chamber into the other.

The sections 10, 11, 12 and 13 are assembled by any suitable means, such as bolts, not shown, with diaphragms between adjacent sections, as shown in the drawing. Thus, a diaphragm 50 is placed between sections 10 and 11; a diaphragm 51 is placed between sections 11 and 12; and a diaphragm 52 between sections 12 and 13. The respective diaphragms are held in spaced relationship by spacing bars 53 and 54. Preferably the spacing bars will have diaphragm center plates formed integrally at each end. It is desirable that the center plates clamping the diaphragm 51 be larger than those clamping diaphragms 50 and 52, so that the effective area of this diaphragm is larger than that of the other two diaphragms. The other diaphragms 50 and 52 are of the same effective size. The various spacing bars 53 and 54, and the centering plate 55, associated with diaphragm 52 (in chamber 13) are held in fixed relationship by any suitable means such as stud, or bolt 56 and nut 57, as shown. The centering plate 55, which is clamped to the diaphragm 52 in the biasing chamber, is formed, as shown, to provide a seat for the spring 30. A centering plate 58, associated with diaphragm 50 in chamber 31, is clamped to the spacing member 53 by any suitable means, such as nut 59 threaded upon projection 60 of spacer 53.

At the neutral position, when the pressure in the high pressure chamber 12 and low pressure chamber 11 are zero, the respective parts are arranged, as shown, with none of the diaphragms under tension. At this position the valve member 41 rests firmly against the valve seat 40 and is held in this position by the supply air pressure acting upon it, and the valve stem 42 will rest upon the projection 60. In the zero position the compression force of the spring 30 is carefully adjusted, by rotation of the adjusting screw 27, so that the force of the spring is exactly equal to, and opposing, the force of the air supply against the free, or outer, end of the valve 41. Thus at the zero position the various diaphragms are at a position of rest, and are held in spaced relationship, one from another, while the air inlet valve 41 is closed. At this position the force of the spring against the diaphragm 52 exactly balances the force of the air supply pressure on the valve 41 to close it. Upon the beginning of flow through the plant, or the beginning of such other condition as is to be measured by the telemetering instrument described, the pressure in the high pressure chamber 12 will obviously and necessarily become greater than that in low pressure chamber 11, and this results in a force moving in a direction into the low pressure chamber 11. This force has a value equal to the pressure difference multiplied by the area of the effective diaphragm 51 minus the pressure difference multiplied by the area of the effective smaller diaphragms 50 or 52. That is, the total force moving to open valve 41 is the high pressure value multiplied by the effective area of diaphragm 51 plus the low pressure value multiplied by the effective area of diaphragm 50. The total force opposing such opening of valve 41 is the low pressure value multiplied by the effective area of diaphragm 51 plus the high pressure value multiplied by the effective area of diaphragm 52. This opposing of forces gives a resultant force tending to open valve 41, which force is within some predetermined range, to be equalled by a controlled air pressure in some selected range, say 0 to 4 pounds per square inch, in chamber 31 and acting on diaphragm 50 to close the valve.

Obviously, the use of diaphragms permits the avoidance of power consuming friction glands, and the use of diaphragms of different areas provides that the total force in a predetermined direction will be reduced by the opposing forces on the diaphragms operating in the opposite direction. Due to the fact that I use diaphragms of different size the total force tending to open the valve 41 is not the total force acting against the diaphragm 51, but is reduced to some predetermined extent by the opposing forces on the various diaphragms.

Upon movement of the diaphragms toward the low pressure chamber 11 the valve 41 is lifted from its seat and air under supply pressure from the inlet chamber 32, is admitted into the controlled air pressure chamber 31. The pressure in the chamber 32 builds up until it creates enough force against the diaphragm 50 to exactly balance the difference in forces due to pressures in the high and low pressure chambers. At this point the diaphragms move toward the high pressure chamber 12 to close the valve 41. There is an escape of a small amount of air through the minute port 36, which is balanced by a "cracking" of the valve 41. Thus the sum of the forces in one direction is always balanced by a sum of the forces in the other direction, except when the conditions to be measured are changing. Obviously the air pressure in the controlled air pressure chamber 31 will always be proportional to the resultant of forces between the high and the low pressure chambers.

In a conventional water filter plant the difference in high and low pressure may be as great as about 15 feet of water, and will vary from that maximum down to zero. Ordinarily it is desired to convert this pressure difference to a controlled air pressure ranging from 0 to 4 pounds per square inch. Thus the applied hydraulic head, or differential, applied to the chambers 11 and 12 will vary from zero to approximately 15 feet of water, which is balanced by a selected controlled air pressure, usually ranging from 0 to 4 pounds per square inch. As the relative areas of the diaphragms are fixed, the force of the controlled air pressure in chamber 32 necessary to achieve balance, will be proportional to the pressure difference on the diaphragm 51. Obviously, the relative sizes of the diaphragms will depend upon the range of pressure differential to be measured. In one instance a convertor of this type was adapted to convert a differential pressure equivalent to 5.5 feet of head (water) to a controlled air pressure within a range of from 0 to 4 pounds. In this instance, I made the two end diaphragms, 50 and 52, with an effective diameter of 1.782 inches and a suitable effective diameter for the center diaphragm 51 was 2.91 inches. Thus, the maximum pressure differential, which gives the maximum force of 10.0 pounds toward the low pressure chamber, is exactly balanced by a maximum air pressure in the controlled air pressure chamber 31 of 4 pounds per square inch. It will be understood that such sizes are merely to illustrate the principle involved, and other sizes can be readily computed to cover the selected range of air pressure to be used and the forces or pressures to be measured. The controlled air pressure in the chamber 31 obviously is transmitted to a receiving instrument through port 35.

Figure 2:
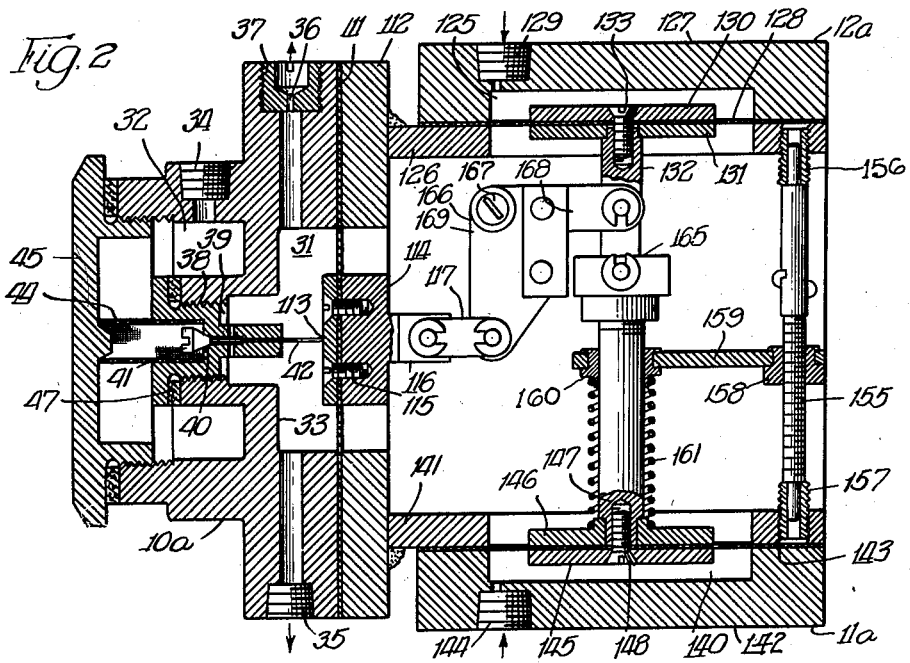
Figure 2 illustrates a second embodiment which is slightly more complicated than that disclosed in Figure 1, but which is adapted to be placed with the axis of the air inlet valve in a vertical position and which can have its various parts replaced without dismemberment of the device as a whole.

The embodiment shown in Figure 2 is essentially the same as that shown in Figure 1, but the various parts are rearranged in order to facilitate repair or adjustment. This embodiment is adapted to be placed with the axis of the air inlet valve in vertical position. The first section 10a is arranged exactly as section 10 in Figure 1, and the arrangement of parts therein is exactly as in Figure 1, so that this portion need not be described. A diaphragm 111 is clamped to the open face of the chamber 31 by any suitable means such as clamping ring 112. The clamping ring 112 and the body portion 10a can be held together by any suitable means such as bolts, not shown. Centering plates 113 and 114 are clamped to the diaphragm 111 by any suitable means such as screws 115. The valve stem 42 just bears against the inner diaphragm plate 113 when the diaphragm 111 is at a position of rest. The outer diaphragm plate 114 is provided with an extension 116 to which is pinned a short connecting link 117.

The high pressure chamber body 12a is mounted at right angles to the direction of movement of the diaphragm 111 and may be formed by an annular plate 126 welded or otherwise rigidly secured to the clamping ring 112, and an associated cover plate 127. A diaphragm 128 is clamped between plate 126 and the cover plate 127 to form the high pressure chamber 125, which is provided with an inlet port 129 adapted to be connected to a source of high pressure. The high pressure diaphragm 128 is provided with centering plates 130 and 131. Associated with the outer diaphragm plate 131 is a connecting link 132, the two plates and the link 132 being held together by any suitable means such as machine screw 133.

Opposed to the high pressure chamber body 12a is a low pressure chamber body 11a, which likewise may be formed by an annular plate 141 welded to the clamping ring 112 and a cover plate 142. A low pressure diaphragm 143 is clamped between the plate 141 and cover 142, forming the low pressure chamber 140. A port 144 connects the low pressure chamber 140 to a point of low pressure. The diaphragm 143 is provided with diaphragm center plates 145 and 146. Associated with the outer center plate 146 is a connecting rod 147, the two plates and the connecting rod being held rigidly together by any suitable means such as machine screw 148.

A guide rod 155 spans the space between the two pressure chambers 125 and 140, respectively, being journaled in suitable bearings 156 and 157. One end of the guide rod 155 is threaded, as shown, to receive a nut member 158 of a spring seat element 159. The spring seat element 159 has a portion 160 encircling the connecting rod 147. A compression spring 161 is seated on the annular portion 160 of the guide seat 159 and the other end butts against the outer diaphragm plate 146 associated with the diaphragm of the low pressure chamber 140. It is obvious that rotation of the guide rod 155 moves the spring seat 159 so as to adjust the force of the spring against the diaphragm plate 146 to a desired value.

The connecting rod 132 associated with the high pressure diaphragm 128 and the connecting rod 147 associated with the low pressure diaphragm 143 are joined as at 165 so as to form a connecting rod holding the two diaphragms 128 and 143 in spaced relationship. A bell crank 166, rotatable about a pivot 167 has one arm 168 pinned to the connecting rod 132, as shown, and the other arm 169 pinned to the connecting link 117. Thus movement of the diaphragms 128 and 143, in either direction, is translated into a direction of movement normal to the diaphragm 111.

As in the embodiment shown in Figure 1, the compression force of the spring 161 is adjusted so that at the zero position all of the diaphragms are in a state of rest and the valve 41 closes the valve seat 40 and air under pressure in chamber 32 is excluded from the controlled air pressure chamber 31. As soon as pressure are applied to the respective high and low pressure chambers, the diaphragms are forced into a direction toward the low pressure chamber 140. Such movement of the diaphragms 128 and 143, and their connecting linkage, is translated by the bell crank into moving the diaphragm 111 into the controlled air pressure chamber 31, thereby lifting the valve 41 off the valve seat 40 and permitting air under pressure to enter the controlled air pressure chamber 31. A minor portion of such air can escape through the vent 36, but such portion is so small that an air pressure is built up in the chamber 31 which will balance the result of the forces operating on the diaphragms 128 and 143. Thus the high pressure operating against the diaphragm 128 is balanced by the low pressure operating against the diaphragm 143 plus the controlled air pressure operating against the diaphragm 111.

The sizes of the various diaphragms can be readily computed to measure any range of forces desired to balance the forces within this range by any pre-selected controlled air pressure to be used.

Obviously, many modifications or variations of the invention herein before set forth may be made by persons skilled in the art without departing from the spirit and scope hereof. For example, if the variable to be measured exerts a single force, then such a force can be applied directly to the diaphragm 111 and the opposed low and high pressure chambers can be eliminated. Whether the variable to be measured can be measured by a single force, or pressure, or must utilize the differential between opposing forces or pressures is immaterial. The two embodiments shown give examples of the latter, but obviously the invention broadly lies in how the force or resultant force is utilized. Accordingly, the claims are not to be limited to the specific forms shown.

I claim:

1. Apparatus for balancing by pneumatic pressure within a predetermined range a differential of two applied forces comprising a hollow casing, a diaphragm associated with said casing and forming therewith a controlled pressure chamber, a controlled air port from said chamber, a constantly open air vent from said chamber, an air inlet chamber, an air supply inlet into said inlet chamber, a passageway from said air inlet chamber to said controlled pressure chamber, a valve associated with said passageway and so constructed as to be held in closed position by the force of supply air in said inlet chamber, means for positioning said valve from movement of said diaphragm, means forming in said casing a high pressure chamber and a low pressure chamber, diaphragms associated with said high and low pressure chambers, pressure inlets into said high and low pressure chambers, spacing means between said last mentioned diaphragms, means for applying any resultant force on said spacing means against the diaphragm associated with said controlled air pressure chamber, and an adjustable bias to equalize the force of supply air opposing opening of said valve.

2. A pressure transmission apparatus comprising a cylindrical casing, diaphragms in said casing dividing the interior thereof into a controlled pressure chamber, a low pressure chamber and a high pressure chamber, spacing means holding said diaphragms in spaced relationship one to another, pressure inlets into said low pressure chamber and said high pressure chamber, an air inlet chamber, an air supply inlet into said air inlet chamber adapted to be connected to a source of supply air under pressure, a controlled air port from said controlled pressure chamber, a vent from said controlled pressure chamber, a passageway from said air supply inlet chamber to said controlled pressure chamber, a valve in said passageway, means for positioning said valve from movement of said diaphragms, and an adjustable bias balancing the force exerted by supply pressure in said inlet air chamber against the opening of said valve.

3. A pneumatic telemetering transmitter for converting a variable force to be measured to a controlled air pressure proportional to such force which comprises a casing and an associated diaphragm forming an air pressure chamber, an air supply inlet passage into said air pressure chamber, a valve in said inlet passage, an adjustable bias balancing the supply air pressure in said passage opposing opening of said valve, means for positioning said valve from movement of said diaphragm, a controlled air pressure port from said chamber and adapted to be connected to a receiving instrument operated by the controlled air pressure, a vent from said chamber, and means for applying a variable force to be measured against said diaphragm in opposition to air pressure in said air pressure chamber.

4. A pneumatic telemetering transmitter for converting a variable force to be measured to a controlled air pressure proportional to such force which comprises a casing and an associated diaphragm forming a controlled air pressure chamber, an air supply inlet port into said controlled air pressure chamber, a valve in said inlet port, means for positioning said valve from movement of said diaphragm, a controlled air pressure outlet from said controlled air pressure chamber and adapted to be connected to a receiving instrument operated by the controlled air pressure, a vent from said controlled air pressure chamber, means forming a high pressure chamber and an opposed low pressure chamber, a diaphragm associated with each of said last mentioned chambers, a pressure inlet into each of said last mentioned chambers, a spacing means between said last mentioned diaphragms, a connecting means joining said spacing means to the diaphragm of said air pressure chamber, and an adjustable bias balancing the force of supply air opposing opening of said valve.

5. A pneumatic telemetering transmitter for converting a variable force to be measured to a controlled air pressure proportional to such force which comprises a casing and an associated diaphragm forming a controlled air pressure chamber, an air supply inlet port into said controlled air pressure chamber, a valve in said inlet port, means for positioning said valve from movement of said diaphragm, a controlled air pressure outlet from said controlled air pressure chamber and adapted to be connected to a receiving instrument operated by the controlled air pressure, a vent from said controlled air pressure chamber, means forming a high pressure chamber and a low pressure chamber arranged in opposed relationship to each other and perpendicular to the direction of movement of said diaphragm, a diaphragm associated with each of said last mentioned chambers, a pressure inlet into each of said last mentioned chambers, a spacing means between said last mentioned diaphragms, a bell crank connecting said spacing means to the diaphragm of said air pressure chamber, and an adjustable bias balancing the force of the supply air opposing opening of said valve.

WALTER J. HUGHES.

REFERENCES CITED

The following references are of record in the file of this patent:

UNITED STATES PATENTS

| Number | Name | Date |
| --- | --- | --- |
| 1,992,343 | Ahnstrom | Feb. 26, 1935 |
| 2,013,810 | Shimek | Sept. 10, 1935 |
| 2,161,544 | Baker | June 6, 1939 |
| 2,226,865 | Kirchhoff | Dec. 31, 1940 |
| 2,286,282 | Joesting | June 16, 1942 |
| 2,299,884 | Edwards | Oct. 27, 1942 |
| 2,486,047 | Marinelli | Oct. 25, 1949 |